June 15, 1954    V. L. SMITHERS    2,681,377
BATTERY SEPARATOR
Filed April 3, 1953
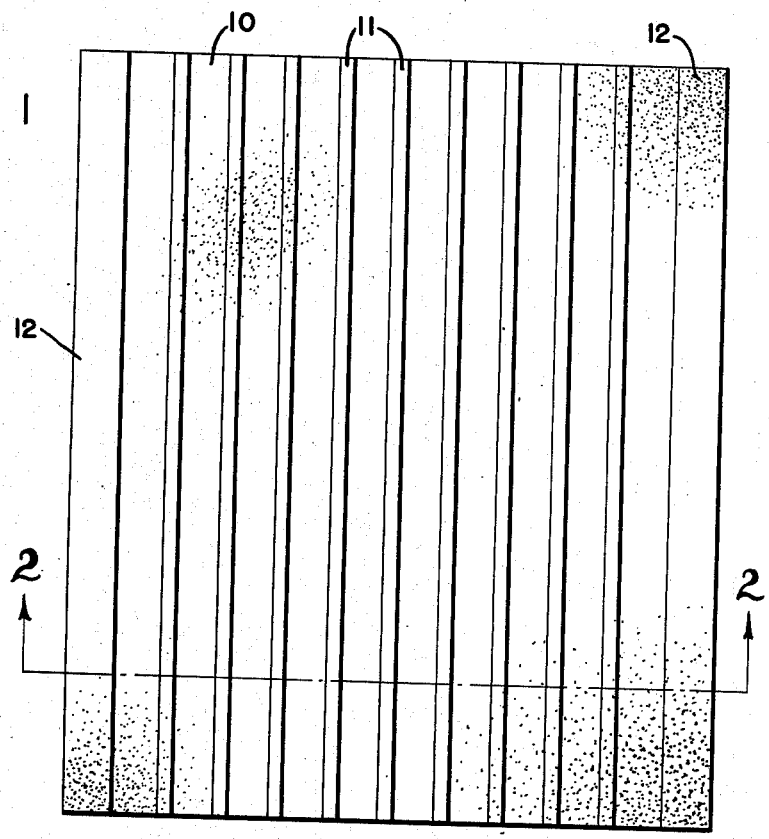
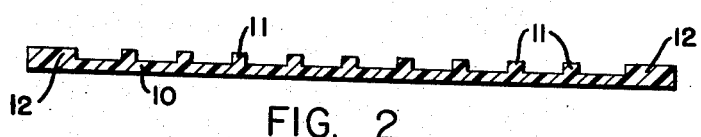
INVENTOR.
VERNON L. SMITHERS
BY
ATTYS.

Patented June 15, 1954

2,681,377

UNITED STATES PATENT OFFICE 2,681,377

BATTERY SEPARATOR

Vernon L. Smithers, Akron, Ohio

Application April 3, 1953, Serial No. 346,664

7 Claims. (Cl. 136—143)

This invention relates to an improvement in storage battery separators and particularly to the provision of a battery separator wherein optimum porosity is attained throughout the separator wall, porosity of the wall varying within narrow limits. This invention also relates to a method of producing such battery separators in such a way that desired optimum porosity is maintained with great fidelity.

The desirability of providing a separator having a closely controlled standard porosity has long been recognized in the art. All areas of the separator should have sufficient porosity to minimize battery resistance and to facilitate proper circulation and diffusion of electrolyte ions, but varying porosity should be avoided to promote uniform working of the battery plates. At the same time, porosity should be sufficiently fine to prevent the entraining of gas bubbles and to support but not entrap the finely divided sponge lead of the negative plate.

Although separator porosity is an important factor as outlined above, there are a number of other requirements which must be fulfilled by a storage battery separator to render it practical in actual use. The separator must be strong enough to withstand the mechanical working to which it is subjected by plate expansion and contraction, temperature changes, and road shocks. It must be chemically resistant to the electrolyte and contain no substances which interfere with the chemistry of the battery. It must be adapted to long periods of shelf storage under varying conditions. It must, of course, constitute an effective plate insulator.

I have provided a separator which fulfills the above requirements and which at the same time is of extremely uniform porosity throughout its entire area. My invention involves the idea of compressing a plastic foam, preferably a blown phenolic condensation resin, into a stiff thin-walled web in which the interconnected voids in the foam are reduced in one dimension to any desired proportion of their original size. The margin between maximum void dimension and minimum void dimension is a linear function (but apparently not a straight-line function) of the degree of foam compression, decreasing as compression of the plastic foam is decreased. Regardless of any initial non-uniformity in the size of the voids in the uncompressed foam, the final compressed product comprises a web, the effective porosity of which varies within extremely narrow limits.

The accompanying drawings illustrate a storage battery separator of the single-ribbed type which may embody my invention. Figure 1 is a side view of the separator and Figure 2 is a view in cross-section taken on line 2—2 in Figure 1. The separator illustrated in the drawings is similar in shape to many in current use, the drawings being included in my disclosure merely to facilitate the description of my invention. It will be apparent, however, that my invention is applicable to a wide variety of possible separator shapes in addition to that specifically illustrated.

The illustrated separator comprises a relatively thin web 10 which is stiffened by a series of parallel spaced ribs 11 and a pair of relatively wide marginal ribs 12. The separator was prepared as follows:

A slab of phenolic resin foam was prepared having a thickness of approximately 1.25 inches and a density of approximately 5.1 ounces per cubic foot. The slab was then compressed between a flat die and a grooved die under a pressure of 1800 p. s. i. until the thickness at the thin section of the web was reduced to approximately .023 inch. The dimensions of the grooved die were such that the reinforcing ribs 11 and 12 were given a thickness of approximately .065 inch at the time that the thin section of the web was compressed to .023 inch.

The plastic foam may be compressed on a flat press or a roll press, or it may be flattened down in any other suitable manner. Although the reduction in void size is predominantly along the dimension normal to the web surface, apparently the overlapping of void walls and the offsetting of void-to-void passages occasioned by compression of the foam renders the decrease in the dimension normal to the web surface determinative of porosity. Furthermore, whatever variation between maximum and minimum porosity there may be from increment to increment of the uncompressed foam is substantially completely eliminated following foam compression.

As disclosed above, the reinforcing ribs 11 and 12 represent merely relatively non-compressed portions of the foam from which the separator is formed. Although the area covered by these ribs is small as compared to total web area, it may be preferable to obviate the relatively high porosity of these areas by sealing the rib surfaces to which any suitable sealer or filler may be applied. Alternatively, the rib portions of the separator may be formed from extra deep thicknesses of the foam, either as part of the web pressing operation or otherwise. The natural strength of the separator may be augmented by suitable reinforcing means; for example, mats or grids of glass fibre may be compressed onto the web either as part of the web pressing operation or otherwise.

My invention contemplates the provision of a constant porosity separator by compression of a blown plastic foam which is otherwise chemically and electrically adapted to storage battery use. Alternatives to the specific embodiments of my invention which are herein set forth will suggest themselves to the art. Accordingly, my invention is not to be limited to such specific embodiments but is to be defined by the following claims.

What is claimed is:

1. A battery separator comprising a web consisting essentially of blown phenolic condensation resin compressed in one direction, the average dimension of foam voids along directions normal to said one direction being greatly in excess of the average dimension of foam voids along said direction.

2. A battery separator comprising a web consisting essentially of a blown phenolic condensation resin, said resin being compressed from its initial blown state, said compression being predominantly along a direction normal to the web surface.

3. The method of manufacturing a battery separator comprising the steps of providing a web comprising a blown phenolic condensation resin and compressing said web to a small fraction of its initial thickness.

4. A battery separator comprising a web consisting essentially of blown phenolic condensation resin, the voids in said resin being fore-shortened along the direction normal to the surface of said web.

5. A battery separator comprising a web consisting essentially of a blown phenolic condensation resin, cross-sections taken on planes vertical to the surface of said web exhibiting elongated voids within said web, said voids being oriented in a direction parallel to said web surface.

6. A battery separator comprising a web consisting essentially of a blown plastic foam, said foam being compressed from its initial blown state, said compression being predominantly along a direction normal to the web surface.

7. A battery separator comprising a web consisting essentially of a plastic foam, the voids in said foam being foreshortened along the direction normal to the surface of said web.

No references cited.